United States Patent
Ito et al.

(10) Patent No.: US 9,239,896 B2
(45) Date of Patent: Jan. 19, 2016

(54) METHODOLOGY FOR PREVENTING FUNCTIONAL FAILURE CAUSED BY CDM ESD

(75) Inventors: Choshu Ito, San Mateo, CA (US); Tze Wee Chen, Stanford, CA (US); William Loh, Fremont, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 790 days.

(21) Appl. No.: 12/255,002

(22) Filed: Oct. 21, 2008

(65) Prior Publication Data

US 2010/0100859 A1  Apr. 22, 2010

(51) Int. Cl.
*G06F 17/50* (2006.01)

(52) U.S. Cl.
CPC ........ *G06F 17/5045* (2013.01); *G06F 17/5036* (2013.01); *G06F 2217/72* (2013.01); *G06F 2217/82* (2013.01)

(58) Field of Classification Search
CPC .................................................. G06F 17/5072
USPC ......................................... 716/1, 4, 100, 110
See application file for complete search history.

(56) References Cited

U.S. PATENT DOCUMENTS

| | | | |
|---|---|---|---|
| 2002/0138817 A1* | 9/2002 | Lee et al. ......................... | 716/12 |
| 2005/0029595 A1* | 2/2005 | Rodov et al. .................. | 257/355 |
| 2006/0041397 A1* | 2/2006 | Kemper et al. ................ | 702/117 |
| 2007/0058308 A1* | 3/2007 | Thijs et al. ...................... | 361/56 |

* cited by examiner

*Primary Examiner* — Suchin Parihar

(57) ABSTRACT

A design methodology which prevents functional failure caused by CDM ESD events. A transistor model is used to model the final states of cells, and a simulator is then used to identify invulnerable cells. Cells that are potential failure sites are then identified. The cells which have been identified as being potential victims are replaced by the previously-identified invulnerable cells that have the identical logic function. On the other hand, if a cell with identical function cannot be found, an invulnerable buffer cell (that will not effect logic function) can be inserted in front of the potential victim transistor as protection. By replacing all the potential victim cells with cells which have been determined to be invulnerable, the resulting design will be guaranteed to be CDM ESD tolerant.

8 Claims, 1 Drawing Sheet

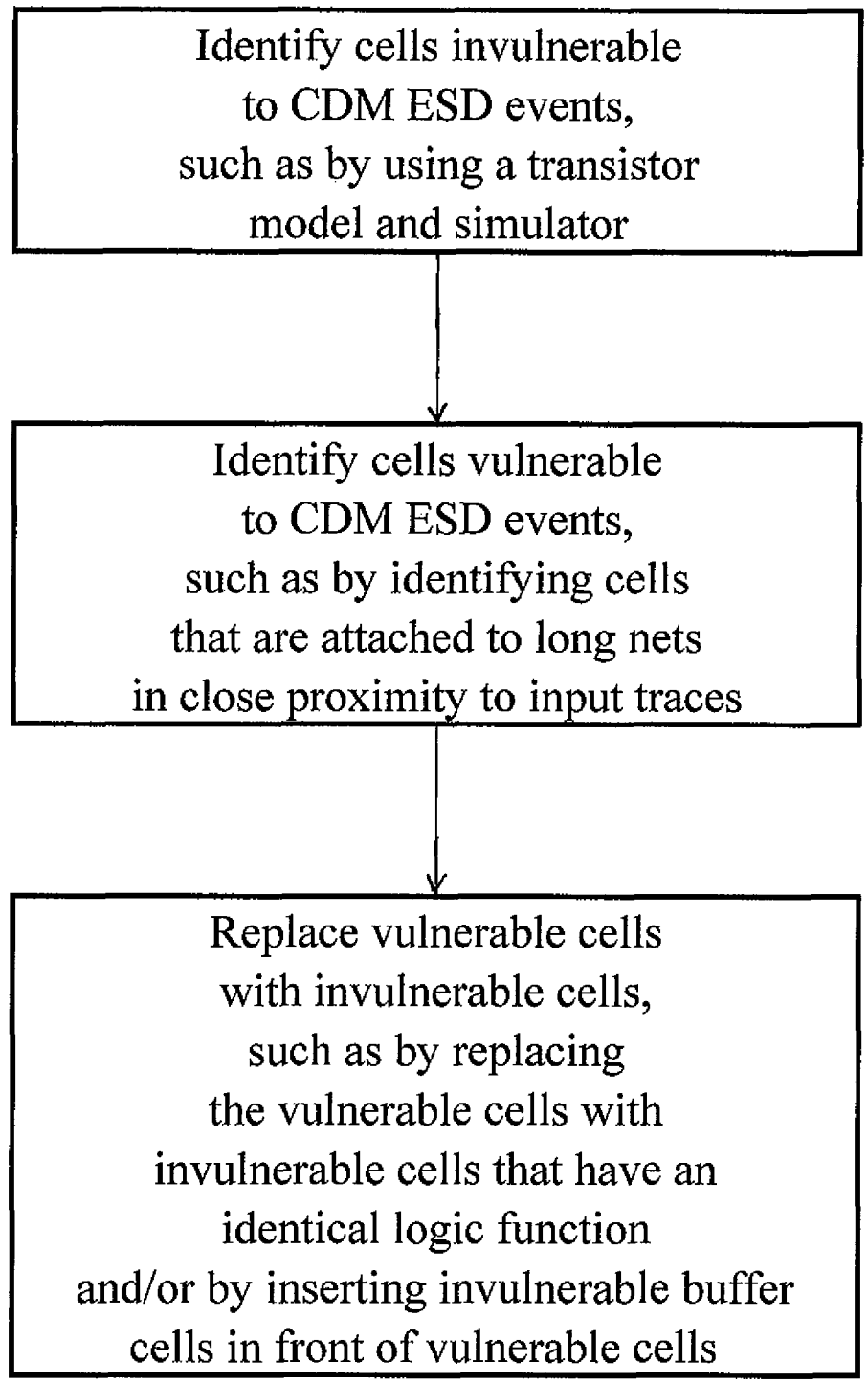

METHODOLOGY FOR PREVENTING FUNCTIONAL FAILURE CAUSED BY CDM ESD

BACKGROUND

The present invention generally relates to Electrostatic Discharge (ESD) testing, and more specifically relates to a design methodology for preventing functional failure caused by ESD.

Semiconductor products are becoming increasingly complex, with more and more functions being integrated into each component. Integrated Circuits (IC's), referred to as Systems on Chip (SoC) or Systems in Package (SiP), are reaching new levels of integration—various types of circuit blocks are combined inside a single package on a single die or combinations of multiple dice. These include analog, digital, radio frequency, opto-electronic, and microelectronic devices. Also, the process technologies are scaling according to Moore's Law, with devices operating in very low voltage regions of one volt and less. This advancing level of circuit complexity is pushing technology to a new echelon, which affects the ESD immunity of semiconductor IC's.

Research shows that up to 25% of field returns are due to ESD damage, which results in huge costs to semiconductor manufacturers in terms of materials, recycling, and protecting against ESD in manufacturing areas. Additionally, there could be adverse effects on a vendor's reputation and repeat sales to end users. In turn, ESD protection can cost manufacturers up to 10 percent of their annual revenue in terms of protection, designing prevention methods, and processing field failures.

ESD testing standards include models such as Machine Model (MM) and Charged Device Model (CDM). The elements that define these tests include a real-world example of a charged capacitance and a discharge path that occurs.

There exists a set of standards that define how ESD tests should be conducted for qualification testing. These standards, set forth by JEDEC and the ESD Association, form the basis of the ESD testing sequences performed. For example, a vendor will submit several fully functional IC's to an ESD testing service. The tester will be calibrated and verified using an oscilloscope, and the high voltage discharge waveforms will be verified before testing begins. The IC's are then installed, and ESD testing commences. The first sequence is to sweep current and measure voltage, to develop a series of curve traces for each of the pins on the IC. When the voltage application sequencing beings, various curve traces are taken throughout the process in order to identify worst-case failing conditions. If the curve-trace shifts after the ESD pulse is applied, it is assumed that a failure has occurred. Comparisons are typically made throughout the testing process to identify shifts or shorts that may have developed as a result of the ESD pulses. After testing is complete, the IC's are sent to the automated test floor to have final parametric and functional testing performed (ATE testing), which is the final verification of a passing or failing test for the IC.

With regard to the different testing methods that are used, Machine Model (MM) was developed in the 1990's as a way of modeling what happens in auto manufacturing facilities when a machine becomes electrostatically charged, and discharges into an IC when it comes in contact with it. This model is used less today than it was in the past.

The Charged Device Model (CDM) test method is steadily taking the place of the MM testing method for today's ESD testing. This method simulates what happens in an automated manufacturing environment when an IC becomes triboelectrically charged, and the part discharges when it comes in contact with a grounded conductor. The CDM discharge is a fast transient, which takes place over a couple of nanoseconds at most. This is a more challenging device to model, and is based on the size and the capacitance of the IC being tested, with little impedance to reduce the current. This can result in high currents (i.e., well above five to six amperes) being discharged in a short duration of one nanosecond or less. As such, the CDM test method stands as the most practical real world test for ESD issues today.

The CDM testing procedure consists of the device under test (DUT) being placed on the tester with the leads or contacts facing up. Specifically, the DUT is placed on a thin layer of flame retardant (FR-4) material, and under the flame retardant material is a metal field plate. The flame retardant material which acts as an insulating capacitor between the DUT and the metal field plate. A high voltage power supply is used to raise the metal field plate to the required CDM test voltage level (typically between 500 and 1000 volts), and a robotic pogo probe is brought into contact with a pin under test. A high-current electric discharge takes place, which is verified by monitoring the ground connection of the pin under test. Subsequently, the metal field plate is grounded to remove any residual charge and the process is repeated. CDM industry standards require that each pin on the DUT receives three positive and three negative pulses, resulting in six total discharges per pin. A device is deemed to have failed if, after exposure to ESD, the device no longer meets its data sheet specifications.

CDM failures typically occur in two areas on the chip: in the core as dielectric failures due to voltage build-up during the CDM discharge, or in the Input/Output circuitry as metallization or junction failures due to current crowding.

SUMMARY

An embodiment of the present invention provides a new design methodology that prevents CDM ESD from causing functional failure.

BRIEF DESCRIPTION OF THE DRAWINGS

The organization and manner of the structure and operation of the invention, together with further objects and advantages thereof, may best be understood by reference to the following description, taken in connection with the accompanying drawing, wherein FIG. 1 illustrates a design methodology which is in accordance with an embodiment of the present invention.

DETAILED DESCRIPTION OF A SPECIFIC EMBODIMENT OF THE INVENTION

While the invention may be susceptible to embodiment in different forms, there is shown in the drawings, and herein will be described in detail, a specific embodiment of the invention. The present disclosure is to be considered an example of the principles of the invention, and is not intended to limit the invention to that which is illustrated and described herein.

The inventors have discovered that during a CDM ESD event, current may couple into the core logic and may cause gate oxide breakdown at the input transistors of logic cells. During such CDM ESD events, it is difficult to quantify how much damage a gate oxide may experience. The present invention provides a way to prevent functional failure even without knowing the extent of oxide damage. In other words, an embodiment of the present invention provides a new design methodology that prevents CDM ESD from causing functional failure.

Transistor gate oxide breakdown reaches some sort of final state, wherein the transistor characteristics do not change even with further stress. As such, some logic cell blocks can never fail after a CDM ESD event. This is because the worst case oxide breakdown is this final state, and if logic cells can still function even with this worst case transistor within it, then this logic cell can never fail.

As shown in FIG. 1, a design methodology which is accordance with an embodiment of the present invention provides that cells which are invulnerable to CDM ESD events are identified, such as by using a transistor model to model the transistors final states, and then a simulator is used to identify the invulnerable cells.

Then, the cells that are potential failure sites are identified. Long nets in close proximity to input traces are required for CDM energy to couple into the core. As such, cells that are attached to such long nets are potential victims. The methodology then provides that the cells which have been identified as being potential victims are replaced by the previously-identified invulnerable cells that have the identical logic function. On the other hand, if a cell with identical function cannot be found, an invulnerable buffer cell (that will not effect logic function) can be inserted in front of the potential victim transistor as protection. By replacing all the potential victim cells with cells which have been determined to be invulnerable, the resulting design will be guaranteed to be CDM ESD tolerant.

The design methodology is a robust methodology for preventing functional failure caused by CDM ESD events. Once vulnerable and invulnerable cells are identified and tabulated, swapping is simple via an Engineering Change Order (ECO). Identification of potential victims is also simple, as it will be net length based. Execution speed of the flow is very fast. Use of the methodology will typically result in different transistor sizing depending on the net length and proximity to input/output traces.

While an embodiment of the present invention is shown and described, it is envisioned that those skilled in the art may devise various modifications to the embodiment without departing from the spirit and scope of the present invention.

What is claimed is:

1. A method of designing an integrated circuit to provide that the integrated circuit does not suffer any functional failure caused by CDM ESD events, said method comprising:

using a first process to identify invulnerable cells of the integrated circuit by using a computer, said invulnerable cells being invulnerable to CDM ESD events;

after using the first process to identify invulnerable cells, using a second process distinct from said first process to identify vulnerable cells of the integrated circuit, said vulnerable cells being vulnerable to CDM ESD events; and using an engineering change order to replace vulnerable cells of the integrated circuit which were identified during the second process with invulnerable cells of the integrated circuit which were identified during the first process.

2. A method as recited in claim 1, wherein the step of using a first process comprises using a transistor model and a simulator.

3. A method as recited in claim 1, wherein the step of using a second process comprises identifying cells that are attached to long nets in close proximity to input traces.

4. A method as recited in claim 1, wherein the step of using a first process comprises using a transistor model and a simulator, and the step of using a second process comprises identifying cells that are attached to long nets in close proximity to input traces.

5. A method as recited in claim 1, wherein the step of replacing vulnerable cells with invulnerable cells comprises replacing the vulnerable cells with invulnerable cells that have an identical logic function.

6. A method as recited in claim 1, wherein the step of using a first process comprises using a transistor model and a simulator, the step of using a second process comprises identifying cells that are attached to long nets in close proximity to input traces, and the step of replacing vulnerable cells with invulnerable cells comprises replacing the vulnerable cells with invulnerable cells that have an identical logic function.

7. A method as recited in claim 1, wherein the step of replacing vulnerable cells with invulnerable cells comprises inserting an invulnerable buffer cell in front of a vulnerable cell.

8. A method as recited in claim 1, wherein the step of using a first process comprises using a transistor model and a simulator, the step of using a second process comprises identifying cells that are attached to long nets in close proximity to input traces, and the step of replacing vulnerable cells with invulnerable cells comprises replacing at least one vulnerable cell with an invulnerable cell that has an identical logic function and inserting at least one invulnerable buffer cell in front of at least one vulnerable cell.

* * * * *